(12) United States Patent
Zhang et al.

(10) Patent No.: US 7,691,990 B2
(45) Date of Patent: Apr. 6, 2010

(54) STRUCTURE DESIGNED FOR ADSORPTION OF DNA INTERCALATORS

(75) Inventors: Zuyi Zhang, Yokohama (JP); Toshiya Yuasa, Kawasaki (JP); Yoshinori Kotani, Yokohama (JP); Kazumi Tanaka, Yokohama (JP); Hajime Ikuta, Matsudo (JP); Kunio Miyasaka, Tokyo (JP)

(73) Assignees: Canon Kabushiki Kaisha, Tokyo (JP); Hitachi Plant Technologies, Ltd., Tokyo (JP)

( * ) Notice: Subject to any disclaimer, the term of this patent is extended or adjusted under 35 U.S.C. 154(b) by 455 days.

(21) Appl. No.: 11/629,788

(22) PCT Filed: Jun. 14, 2005

(86) PCT No.: PCT/JP2005/011212

§ 371 (c)(1),
(2), (4) Date: Dec. 15, 2006

(87) PCT Pub. No.: WO2005/123249

PCT Pub. Date: Dec. 29, 2005

(65) Prior Publication Data

US 2007/0148675 A1    Jun. 28, 2007

(30) Foreign Application Priority Data

Jun. 15, 2004 (JP) ............................. 2004-176890

(51) Int. Cl.
*C07H 21/04* (2006.01)
*A61K 38/16* (2006.01)
*C07K 17/10* (2006.01)
*C07K 17/12* (2006.01)
*C07K 17/00* (2006.01)

(52) U.S. Cl. .................... 536/23.1; 530/350; 530/358

(58) Field of Classification Search ........................ None
See application file for complete search history.

(56) References Cited

U.S. PATENT DOCUMENTS

| 5,370,842 A | 12/1994 | Miyazaki et al. ......... 422/82.06 |
| 5,380,490 A | 1/1995 | Hoshi et al. .................... 422/73 |
| 5,512,446 A | 4/1996 | Miyazaki et al. .............. 435/7.2 |
| 5,534,441 A | 7/1996 | Miyazaki et al. ............. 436/517 |
| 5,601,983 A | 2/1997 | Takayama et al. ............... 435/6 |
| 5,658,795 A | 8/1997 | Kato et al. ................ 435/262.5 |
| 5,679,581 A | 10/1997 | Miyazaki et al. ............. 436/517 |
| 5,700,647 A | 12/1997 | Miyazaki et al. ................ 435/6 |
| 5,846,730 A | 12/1998 | Miyazaki et al. ................ 435/6 |
| 5,866,003 A | 2/1999 | Okubo et al. ................ 210/610 |
| 5,882,917 A | 3/1999 | Sakuranaga et al. .......... 435/262 |
| 6,316,606 B1 | 11/2001 | Kishi et al. ................... 536/4.1 |
| 6,900,295 B2 | 5/2005 | Kishi et al. ................... 536/4.1 |
| 2006/0051765 A1 | 3/2006 | Zhang et al. .................... 435/6 |
| 2006/0110816 A1 | 5/2006 | Liu et al. .................. 435/262.5 |
| 2006/0205007 A1 | 9/2006 | Zhang et al. .................... 435/6 |
| 2007/0135672 A1 | 6/2007 | Zhang et al. ................. 588/315 |

FOREIGN PATENT DOCUMENTS

| JP | 10-175994 | 6/1998 |
| JP | 2000-350597 | 12/2000 |
| JP | 2001-81098 | 3/2001 |
| JP | 2004-351336 | 12/2004 |
| WO | 2004/062767 | 7/2004 |
| WO | 2004/106552 | 12/2004 |

OTHER PUBLICATIONS

Norio Nishi, et al., "DNA as a Functional Material to Remove Environmental Pollutants", High Polymers, Japan, vol. 52, No. 3, 2003, pp. 134-137. (with translation).

*Primary Examiner*—James Martinell
(74) *Attorney, Agent, or Firm*—Fitzpatrick, Cella, Harper & Scinto

(57) ABSTRACT

Provided is a structure designed for adsorption, which is suitable for removing dioxin and dioxin-like substances from leachate and ground water from polluted soils or garbage, washing effluent from garbage incinerators and so on that contain DNA intercalators, particularly, dioxin and dioxin-like substances. The structure designed for adsorption is a structure designed for adsorption having an adsorbing layer containing, as a constituent, a DNA complex containing a DNA-binding protein, DNA including double strand DNA and a carrier, which can selectively remove DNA intercalators with high efficiency from water, gas and so on containing them.

10 Claims, No Drawings

STRUCTURE DESIGNED FOR ADSORPTION OF DNA INTERCALATORS

TECHNICAL FIELD

The present invention relates to a structure designed for adsorption of chemical substances exhibiting so-called intercalation phenomena in which the chemical substances are inserted into double strand DNA molecules to form stable intermolecular bonds (hereinafter, referred to as DNA intercalators), which can be utilized for adsorbing and immobilizing DNA intercalators. In particular, the present invention relates to a structure designed for adsorption, which can be utilized for adsorbing and immobilizing, dioxin and dioxin-like substances among DNA intercalators, for example, the present invention relates to a structure designed for adsorption, which is suitable for the purpose of removing dioxin and dioxin-like substances contained in polluted soils, leachate from garbage (waste), groundwater and washing effluent from garbage incinerators.

BACKGROUND ART

Ethidium bromide, acridine dye, benzofuran, dibenzo-p-dioxane and the like conventionally used for staining cells and chromosomal genes are known as DNA intercalators that give rise to intercalation into double strand DNA molecules to form stable intermolecular bonds. For example, the formation of a strong intermolecular bond with genetic DNA by a DNA intercalator may cause inhibitory action on the expression of the genetic DNA. Many of these compounds that induce DNA intercalation are harmful to human bodies and their carcinogenicity is often pointed out. Although the mechanism of carcinogenesis resulting from DNA intercalators remains somewhat unclear, it is suggested that their properties of specifically interacting with double strand DNA are closely related to the mechanism.

Of DNA intercalators, polychlorinated dibenzo-para-dioxanes, polychlorinated dibenzofurans, coplanar polychlorinated biphenyls (hereinafter, referred to as dioxin and dioxin-like substances) are contained in trace amounts in exhaust from incinerators, industrial waste water, smoke from open-air burning and so on and have been formerly discharged into the environments such as air, soils and rivers. Dioxin and dioxin-like substances at low concentrations discharged into the environment are gradually condensed in the food-chain process of the natural world. As a result, the possibility of bringing about the accumulation of the dioxin and dioxin-like substances in the bodies of humans as final predators has been pointed out. In recent years, progress in measurement techniques allowed the quantification of trance amounts of dioxin and dioxin-like substances and made possible to estimate quantitatively the extent of pollution in the environments such as air, soils, groundwater and rivers and in foods, human bodies, breast milk and so on. Consequently, it has been found out that extensive pollution is taking place.

Because dioxin and dioxin-like substances are neither metabolized nor decomposed in organisms and are accumulated in their bodies, the dioxin and dioxin-like substances even at very low concentrations may have deleterious effects on human health, such as carcinogenicity, immunotoxicity and reproductive toxicity, posing serious social problems. Measures such as improvement in incinerators from which dioxin and dioxin-like substances are emitted, the prevention of discharge and the prohibition of open-air burning are taken to prevent dioxin and dioxin-like substance from being newly discharged into the environment. However, there is a demand for the removal and recovery of dioxin and dioxin-like substances that have already been discharged into the environment and are being formed inevitably.

Techniques for efficiently separating or decomposing and removing dioxin and dioxin-like substances at low concentrations are investigated in various quarters, for the purpose of removing and recovering dioxin and dioxin-like substances that have already been discharged into the environment or of reducing the discharge of dioxin and dioxin-like substances contained in exhaust and washing effluent from incinerators. For example, adsorption treatment with activated carbon, oxidative decomposition treatment with ultraviolet rays, ozone, hydrogen peroxide and so on, incineration treatment by decomposition at high temperatures and coagulation treatment by coagulation sedimentation have been proposed.

The activated carbon treatment is an approach that employs activation carbon exhibiting high abliltiy to adsorb various substances present in the dioxin and dioxin-like substances present in the gaseous phase. In this case, various other adsorbent molecules coexist with dioxin and dioxin-like substances at low concentrations and the adsorption activity of activated carbon is consumed by the adsorption of these coexisting adsorbed molecules. Accordingly, the adsorption activity of activated carbon decreases with the passage of time. The rate of removal of dioxin and dioxin-like substances is not always sufficient in light of time average. Moreover, activated carbon must be replaced periodically for maintaining its adsorption activity. This presents cost problems in systems that are continuously used. In the oxidative decomposition treatment, the oxidation of dioxin and dioxin-like substances in the gaseous phase is promoted under ultraviolet irradiation or by the action of ozone at high concentrations. However, its reactor is complicated and expensive. The incineration treatment allows oxidative decomposition in combustion atmospheres by maintaining temperatures around 1000° C. and thus requires large energy relative to very low throughput.

On the other hand, the coagulation sedimentation method seems to be possible means in treating polluted water or the like containing dioxin and dioxin-like substances at low concentrations. However, coagulation sedimentation in itself is a process that gradually progresses and requires space such as sedimentation basins having large capacities. Moreover, the coagulation sedimentation method utilizes, for example, the adsorption of dioxin and dioxin-like substances onto the surfaces of coagulating agents. As in the activated carbon treatment described above, the rate of removal of dioxin and dioxin-like substances is not always sufficient in light of time average.

Some approaches for overcoming the disadvantages of the conventional treatment methods have already been proposed.

Some approaches have been proposed for treating, at high removal rates, dioxin and dioxin-like substances dissolved at low concentrations in polluted water. One example thereof is a method in which a thin film of DNA insolubilized by irradiating, with ultraviolet rays, a film containing an aqueous solution of DNA or DNA generated from the aqueous solution is used as an adsorbent for dioxin and dioxin-like substances (see Japanese Patent Laid-Open No. 2001-081098). The method has an advantage that dioxin and dioxin-like substances in an aqueous solution is selectively bound to DNA contained in this thin film of insolubilized DNA to thereby allow the high-efficiency removal of the dioxin and dioxin-like substances at low concentrations in an aqueous solution. Specifically, the thin film of DNA is provided on a substrate such as a glass or plastic substrate, which is in turn irradiated with ultraviolet rays with a particular wavelength to thereby produce a complex having the film of DNA insolubilized and immobilized on the substrate. Effluent containing dioxin and dioxin-like substances is allowed to flow into treatment equipment in which this complex having the DNA film is placed. On contact of the effluent with the complex having the DNA film, the dioxin and dioxin-like substances are selectively adsorbed onto this DNA film that is insolubilized and immobilized. Thereby, the dioxin and dioxin-like substances at low concentrations are selectively removed with high efficiency.

However, because the method described above employs ultraviolet irradiation to insolubilize and immobilize DNA on the surface of a substrate, the surface area of the DNA film that adsorbs dioxin and dioxin-like substances relies on the surface area of the substrate. When the method is applied to treatment for large amounts of polluted water, complexes having DNA films must be used in large amounts for enlarging the adsorptive surface area of the DNA film. Thus, the preparation of large amounts of complexes having DNA films in advance is a major technical obstacle in applying the method to treatment for large amounts of polluted water. On the other hand, single strand DNA and double strand DNA differ in the property of adsorbing dioxin and dioxin-like substances. In addition, the length and molecular weight of DNA strands should also affect the property of adsorbing dioxin and dioxin-like substances. Japanese Patent Laid-Open No. 2001-081098 does not sufficiently describe means and conditions for optimizing the property of adsorbing dioxin and dioxin-like substances in the thin film of DNA insolubilized by ultraviolet irradiation.

In addition to the approach employing the film of DNA that is insolubilized and immobilized, a technique for large-scale and efficient removal for the purpose of treating larger amounts of polluted water has also been proposed (see Norio Nishi et. al., High Polymer Japan 52, 134 (2003)). In this approach, which uses an aqueous solution of double strand DNA trapped inside of a dialysis membrane, effluent containing dioxin and dioxin-like substances is allowed to flow on the outside of the dialysis membrane and the dioxin and dioxin-like substances contained in the effluent are diffused across the dialysis membrane, and accumulated and condensed in the aqueous DNA solution. The aqueous solution of double strand DNA having the accumulated dioxin and dioxin-like substances is then washed with an organic solvent that can dissolve the dioxin and dioxin-like substances to recover the dioxin and dioxin-like substances into the organic phase, and the washed aqueous solution of double strand DNA is repeatedly utilized. In this method, the contamination of microorganisms into an aqueous solution of DNA used in the treatment sometimes renders the aqueous solution of DNA rotten. Moreover, the stability of double strand DNA becomes a problem in long-term use.

SUMMARY OF THE INVENTION

As described above, the method employing the film of DNA that is insolubilized and immobilized on the surface of a substrate is an effective approach in removing dioxin and dioxin-like substances at low concentrations contained in an aqueous solution. However, the adsorption ability per unit area of a film used of DNA that is insolubilized and immobilized determines the treatment property of the overall equipment thereof. Thus, there is a demand for proposition of adsorbing members for dioxin and dioxin-like substances that are dramatically improved in the adsorption ability per unit area, instead of the film of DNA insolubilized and immobilized on the surface of a substrate, which is used for selectively adsorbing and removing dioxin and dioxin-like substances contained in an aqueous solution.

The present invention has been achieved to solve the above-described problems. An object of the present invention is to provide a structure designed for adsorption comprising a novel adsorbing member exhibiting high ability to adsorb DNA intercalators per unit mass, which can be used in applications for adsorbing and immobilizing DNA intercalators, for example, dioxin and dioxin-like substances, contained in liquid or gas (hereinafter, generically named fluid). The present invention particularly intends to provide an adsorbing member for dioxin and dioxin-like substances and a structure designed for adsorption using the adsorbing member, which are suitable for extensively treating large amounts of polluted water to be treated in treatment for selectively adsorbing and removing dioxin and dioxin-like substances contained in polluted water containing dioxin and dioxin-like substances at low concentrations such as washing effluent from garbage incinerators, garbage leachate, sewage, industrial waste water and ground water. In addition, the adsorbing member and the structure, which are easily manufacturable, can adsorb dioxin and dioxin-like substances with high efficiency per unit mass.

The present inventors have previously proposed the invention relating to a DNA complex with strong supporting power and a method of producing the DNA complex by finding out that a DNA complex with strong supporting power can be produced by immobilizing a double strand DNA molecule on a particular porous carrier and that the double strand DNA molecule immobilized on the surface of the DNA carrier remains capable of undergoing intercalation (see Japanese Patent Application Laid-open No. 2004-351336).

As a result of further investigation, the present inventors have found that protamine and histone that are proteins having the ability to bind to a double strand DNA molecule (DNA-binding proteins) do not directly participate in intercalation in themselves and, however, any of these DNA-binding proteins can be added to DNA including double strand DNA at a particular ratio to construct a DNA complex where the DNA together with the DNA-binding protein is immobilized on a carrier. The DNA complex composed of the DNA-binding protein, the DNA including double strand DNA and the carrier has been confirmed to be able to retain high ability to adsorb DNA intercalators per unit mass of the DNA complex and also confirmed to be improved in durability in long-term use.

Because of the presence of the DNA-binding protein contained in the DNA complex, at least a portion of the DNA, for example, double strand DNA, assumes three-dimensional structure different from that of free DNA including double strand DNA due to the interaction with the DNA-binding protein. Thus, a DNA complex made by adding a DNA-binding protein such as protamine and histone to DNA including double strand DNA at a particular ratio, which is in turn immobilized on a carrier, is estimated to have interaction between the DNA molecule and the DNA-binding protein and interaction between the DNA-binding protein and the carrier in addition to interaction between the DNA molecule and the carrier. Interaction among the DNA-binding protein, the DNA molecule and the carrier as well as the specificity of the three-dimensional structure of the nuclear protein in itself seems to be factors in the expression of excellent intercalation ability. For example, histone forms nucleosome structure where DNA strands are wrapped around a core made of the octameric histone protein. The nucleosome structure has the characteristic function of forming a complex with another nucleosome structure via histone designated as H1 and, finally, forming chromatin structure in which the complexes thus formed are highly condensed. Thus, because of the presence of histone forming a nuclear protein and so on, DNA molecules are retained in a high density per unit volume in the DNA complex. As a result, high intercalation ability can be exerted. Besides, protamine is known to suppress the thermal denaturation of DNA molecules, for example, double strand DNA molecules and also known to exhibit antibacterial activity. Thus, the presence of protamine yields the effect of suppressing the decomposition of the DNA complex by invading bacteria and is estimated to be a factor that also brings about improvement in the stability of intercalation ability and in the mechanical strength of the DNA complex. Although the effect of improving intercalation ability and improving the durability and stability of the DNA complex, which comes with the presence of the DNA-binding protein is found, its detailed mechanism is not yet known at this stage.

The present inventors have completed the present invention on the basis of these series of findings.

That is, the structure designed for adsorption of a DNA intercalator according to the present invention is a structure designed for adsorption of a DNA intercalator that employs a procedure in which a DNA intercalator contained in liquid or gas is selectively adsorbed onto DNA by contacting the DNA with the DNA intercalator, characterized by comprising an adsorbing layer having, as a unit component, a DNA complex comprising a DNA-binding protein in the form of a nuclear protein, DNA including double strand DNA and a carrier, as an adsorbing layer on which the DNA intercalator is selectively adsorbed, wherein the DNA complex contains 0.5 to 10 parts by mass of the DNA-binding protein component per 100 parts by mass of the DNA including double strand DNA, and wherein intercalation ability by mass (IcM) defined in terms of the maximum adsorption mass (mg) of ethidium bromide (EB) per unit mass (1 g) of the DNA complex is 0.5 or more [mg EB/g DNA complex)].

In the structure designed for the adsorption of a DNA intercalator according to the present invention, the DNA complex comprising a DNA-binding protein in the form of a nuclear protein, DNA including double strand DNA and a carrier that is used as an adsorbing member for adsorbing a DNA intercalator has high ability to adsorb DNA intercalators per unit mass of the DNA complex and also has excellent durability when used in water and so on. Therefore, when the structure designed for adsorption of a DNA intercalator is applied to, for example, large-scale treatment of polluted water containing dioxin and dioxin-like substances at low concentrations, it has advantages of being capable of selectively adsorbing dioxin and dioxin-like substances with high efficiency and of easily enhancing throughput.

Other features and advantages of the present invention will be apparent from the following description

BEST MODE FOR CARRYING OUT THE INVENTION

Preferred embodiments of the present invention will now be described in detail.

In the present invention, a method in which a DNA intercalator contained in liquid or gas is selectively adsorbed onto DNA by contacting the DNA with the DNA intercalator is employed for adsorbing and removing a DNA intercalator. That is, a DNA molecule that is brought into contact with a DNA intercalator has the structure of double helix sequentially formed via hydrogen bonds between the nucleic acid base portions in DNA. The DNA molecule adsorbs a DNA intercalator by the use of a phenomenon in which a compound with a particular molecular size and planar structure is stably incorporated between the accumulated base pairs in that double helix structure (intercalation). At this time, because of using the phenomenon of intercalation into the DNA molecule including double strand DNA that is contained in the DNA complex used as an adsorbing member, the DNA complex can adsorb, particularly, dioxin and dioxin-like substances in extremely specific and stable manners. Specifically, the first feature of the structure of the present invention is that the DNA complex contains a DNA-binding protein in the form of a nuclear protein, DNA including double strand DNA and a carrier for immobilizing them thereon and that the partial DNA strands of the said DNA including double strand DNA undergo the action of the DNA-binding protein. In this case, as a result of selecting composition containing 0.5 to 10 parts by mass of the DNA-binding protein component per 100 parts by mass of the DNA including double strand DNA, the DNA complex exhibits an excellent property of adsorbing a DNA intercalator in that intercalation ability by mass (IcM) defined in terms of the maximum adsorption mass (mg) of ethidium bromide (EB) per unit mass (1 g) of the DNA complex is 0.5 or more [mg EB/g DNA complex)].

As described above, the structure designed for the adsorption of a DNA intercalator according to the present invention is a structure designed for the adsorption of a DNA intercalator that employs a procedure in which a DNA intercalator contained in liquid or gas is selectively adsorbed onto DNA by contacting the DNA with the DNA intercalator, characterized by comprising an adsorbing layer having, as a unit component, a DNA complex comprising a DNA-binding protein in the form of a nuclear protein, DNA including double strand DNA and a carrier, as an adsorbing layer on which the DNA intercalator is selectively adsorbed, wherein the DNA complex contains 0.5 to 10 parts by mass of the DNA-binding protein component per 100 parts by mass of the DNA including double strand DNA, and wherein intercalation ability by mass (IcM) defined in terms of the maximum adsorption mass (mg) of ethidium bromide (EB) per unit mass (1 g) of the DNA complex is 0.5 or more [mg EB/g DNA complex)]. In this case, an aspect of the present invention is rendered more preferable by selecting forms described below.

In the present invention, it is desirable that the DNA-binding protein in the form of a nuclear protein contained in the DNA complex should be mainly composed of both or either of protamine and(or) histone. Moreover, the adsorbing layer of the structure for the adsorption of a DNA intercalator comprises can be in the form of a column packed with the DNA complex.

On the other hand, the DNA complex can be in a particle or cloth form. In this case, it is preferred that the carrier contained in the DNA complex should be porous. It is desirable that this porous carrier should be formed with an oxide. It is also preferred to employ, as the oxide used, a mixture of silica and a metal oxide.

In the column packed with the DNA complex, a packed layer portion with the DNA complex can have a porosity of 10 to 90%.

For example, it is more preferable to employ DNA including double strand DNA that is collected from the testis from the salmon and/or digestive caecum from a scallop, as the DNA including double strand DNA contained in the DNA complex.

The present invention is more preferably employed when the DNA intercalator to be adsorbed is any of dioxin and dioxin-like substances.

Hereinafter, the present invention will be described in more detail.

The DNA molecule employed in the adsorption of a DNA intercalator by intercalation caused by its contact with the DNA intercalator may be collected from an organism or may be synthesized with a DNA synthesizer. In the present invention, the DNA utilized for producing the DNA complex is used in composition containing the DNA-binding protein in the form of a nuclear protein together with the DNA including double strand DNA. Therefore, when synthetic DNA is used, it is required to prepare DNA strands having base sequences complementary to each other to form double strand DNA. Besides, procedures for introducing the DNA-binding protein into the double strand DNA prepared from the synthetic DNA are also required. From these points of view, the use of DNA collected from an organism has cost and technical advantages over the use of synthetic DNA. It is preferred to use gene DNA present in a living organism, mainly in the cell nucleus of a living organism, as the DNA collected from an organism. For example, DNA derived from an animal cell, such as DNA derived from the testis (milt) from a salmon, a herring or a cod or derived from the digestive caecum (gonad) from a scallop, contains a DNA-binding protein in the form of a nuclear protein and is suitable for use in the present invention. Particularly, DNA derived from the testis from a salmon or derived from the digestive caecum from a scallop is more preferable because it is available in large amounts and with stability.

The adsorption in itself of a DNA intercalator relies on intercalation into the double helix structure of the DNA molecule. However, because of the selected composition containing the DNA-binding protein component at a particular ratio with respect to the whole DNA including double strand DNA, the DNA complex of the present invention has a high property of adsorbing a DNA intercalator as well as excellent mechanical strength and durability. In this case, the content of the DNA-binding protein component with respect to the whole DNA including double strand DNA is adjusted to range from 0.5 to 10 parts by mass of the DNA-binding protein component per 100 parts by mass of the DNA contained in the DNA complex in preparation. If the content of the DNA-binding protein component per 100 parts by mass of the DNA contained in the DNA complex is less than 0.5 parts by mass, the effect of improving the durability of the DNA complex and the stability of the DNA is small. On the other hand, if the content range of the DNA-binding protein component per 100 parts by mass of the DNA contained in the DNA complex exceeds 10 parts by mass, the durability of the DNA complex is excellent as a natural consequence whereas the property of adsorbing a DNA intercalator tends to gradually decrease. It is noted that, as concerns a phenomenon in which DNA is eluted from the DNA complex accompanying the separation of the double strand DNA molecule into two single strand DNA molecules due to its denaturation, also the function of suppressing the above-described denaturation of the double-stranded DNA is achieved by the presence of the DNA-binding protein contained in such a proper amount that the content of the DNA-binding protein component per 100 parts by mass of the DNA contained in the DNA complex is maintained within the range from 0.5 to 10 parts by mass.

Any of DNA-binding proteins can be used in the present invention as long as they affect at least the partial DNA. For example, a DNA-binding protein capable of assuming the morphology of a conjugated protein where DNA is bound with a DNA-binding protein, i.e., deoxyribonucleoprotein, can be employed. It is preferred to use, as such a DNA-binding protein, a protein molecule mainly composed of both or either of protamine and(or) histone. DNA present in a cell nucleus contains deoxyribonucleoprotein containing histone that assumes the morphology of nucleohistone bound with double strand DNA. Alternatively, depending on the species of organisms, a sperm nucleus contains deoxyribonucleoprotein that assumes the morphology of nucleoprotamine where protamine instead of histone is bound with double strand DNA. This deoxyribonucleoprotein assuming the morphology of nucleohistone or nucleoprotamine is suitable for applications in the present invention because the histone or protamine contained therein is bound with double strand DNA with high stability.

It is noted that the Lowry-Folin method is applied in the present invention to assess the content of the DNA-binding protein in the DNA complex.

On the other hand, as for the strand size (in length), molecular weight of the DNA molecule is preferably in the range from 20,000 to 50,000,000, more preferably from 100,000 to 10,000,000, in consideration of the property of adsorbing a DNA intercalator, efficiency in immobilizing the DNA molecule on the carrier and so on. If the molecular weight of the DNA molecule is less than 20,000, the ability to adsorb a DNA intercalator demonstrates a propensity to decrease as the strand length gets shorter. On the other hand, if the molecular weight of the DNA molecule is more than 50,000,000, the liquid viscosity of an aqueous solution of DNA/protein that is used for preparing the DNA complex rapidly rises. Namely, when the aqueous solution is to be immobilized on the carrier, there are increasing difficulties associated with procedures for allowing the aqueous solution to be uniformly supported and dispersed on the carrier.

On the other hand, when intercalation into the double helix structure of the DNA molecule is employed, it is more preferable to use the double helix structure of double strand DNA. Therefore, the DNA contained in the DNA complex used in the present invention is DNA including double strand DNA. The content of the double strand DNA with respect to the whole DNA is preferably 3% by mass or more. For DNA collected from a living organism, the process of extraction, separation and purification often involves conditions and procedures for causing the cleavage of the strands of a DNA molecule as well as the denaturation of double strand DNA into single strand DNA. Thus, even at the stage of producing an aqueous solution of DNA/protein prior to the preparation of the DNA complex, the sufficiently careful handling of the DNA is required for suppressing reduction in the content of double strand DNA. If the content of the double strand DNA with respect to the whole DNA contained in the DNA complex is less than 3% by mass, the double helix structure of the DNA molecule that adsorbs a DNA intercalator is not adequate and the desired property of adsorbing a DNA intercalator can not be attained. The content of the double strand DNA with respect to the whole DNA can be measured using an assessment kit commercially available from e.g., PicoGreen dsDNA Quantitation Kit (Molecular Probes Inc.) according to the manufacture's protocol. In the present invention, a value measured by employing the commercially available assessment kit described above is used as the content of double strand DNA with respect to the whole DNA.

When the DNA complex used in the present invention is used as an adsorbing layer in the structure designed for adsorption, it is preferable that the adsorbing layer is used in the form of a column packed with the DNA complex, which is in turn brought into contact with fluid containing a DNA intercalator. The geometry or form of the DNA complex can be selected from various forms such as particle, bulk, plate, tube or cloth form. Among them, it is preferred to adopt the DNA complex having a geometry in particle or cloth form. For example, when packed into a column, the DNA complex in particle or cloth form is preferred in that the DNA complex is brought into sufficient contact with fluid containing a DNA intercalator.

On the other hand, because the DNA molecule is immobilized on the surface or in the pore of the carrier to form the DNA complex, it is preferred to use a porous material as the carrier in light of the efficiency of the immobilization and the stability of the immobilized DNA molecule. For example, the use of a porous oxide material is preferred from the viewpoint of stability. Silica (silicon dioxide), or various metal oxide materials, for example, aluminum oxide, titanium oxide, iron oxide, zirconium oxide, tin oxide and tantalum oxide, which are generally used as materials for carriers employed in the immobilization of DNA molecules, can be employed. A porous material composed of a mixture of silica and a metal oxide can also be used. When a mixture of silica and a metal oxide is used as a material composing the porous carrier, the content of the metal oxide in the mixture is preferably selected in the range from 0 to 50% by mass. Depending on the types of the metal oxide contained in the mixture, the effect of improving the rate of immobilization of a DNA molecule is expected by virtue of a bond formed between the metal oxide and the phosphate group of the DNA molecule. Meanwhile, if a bond between the metal oxide and the phosphate group of the DNA molecule is formed to an excessive degree, the bond may also influence the double helix structure of double strand DNA. However, when the content of the metal oxide in the mixture of the silicon oxide and the metal oxide is 50% by mass or less, the influence on the double helix structure of DNA is restrained to a low degree which does not matter.

For example, a method in which an aqueous solution containing DNA including double strand DNA and a DNA-binding protein is prepared in advance and a porous oxide carrier is immersed in the solution to allow its solidification can be used for immobilizing a DNA molecule on a porous oxide carrier to form a DNA complex. Alternatively, an oligomer having an oxide component or a colloidal oxide dispersion, which is produced by, for example, the hydrolysis of metal alcoholate, is supplemented and mixed with DNA including double strand DNA and a DNA-binding protein, followed by solidification by the removal of the dispersing solvent to allow the formation of a DNA complex containing the porous oxide carrier on which the DNA including double strand DNA and the DNA-binding protein are immobilized. The content of the DNA with respect to the porous oxide carrier in the DNA complex is selected in the range from 0.1 to 10 parts by mass, preferably 0.5 to 5 parts by mass, of the DNA including double strand DNA with respect to 100 parts by mass of the oxide. If the content of the DNA including double strand DNA is less than 0.1 parts by mass with respect to 100 parts by mass of the oxide, the intercalation ability of a DNA intercalator per unit mass of the DNA complex is poor. On the other hand, if the content of the DNA including double strand DNA is more than 10 parts by mass with respect to 100 parts by mass of the oxide, the movement of a DNA intercalator into pores formed in the porous oxide carrier in the produced DNA complex might be reduced. A DNA complex that does not attain the desired level of intercalation ability per unit mass of the DNA complex is not suitable for use in the structure designed for the adsorption of a DNA intercalator according to the present invention.

In the structure designed for the adsorption of a DNA intercalator according to the present invention, the DNA complex used as an adsorbing member has the ability above a certain level to adsorb a DNA intercalator from fluid containing a DNA intercalator. That is, intercalation ability by mass (IcM) defined in terms of the maximum adsorption mass (mg) of ethidium bromide (EB) per unit mass (1 g) of the DNA complex is set to 0.5 or more [mg EB/g DNA complex)]. If the intercalation ability (IcM) is below 0.5 [mg EB/g DNA complex], the ability to adsorb a DNA intercalator per unit length of the adsorbing layer is reduced and the length of a column is required to be extended for adsorption and removal when the adsorbing layer is used in the form of a column. In this case, the fluid resistance of the whole column is increased and the column is therefore inconvenient to use in large-scale removal treatment.

In the structure designed for the adsorption of a DNA intercalator according to the present invention, it is desirable that a packed layer portion with the DNA complex should have a porosity of 10 to 90% when the form of a column packed with the DNA complex is adopted. If the porosity in the packed layer portion with the DNA complex is less than 10%, fluid resistance at the time when fluid containing a DNA intercalator is conveyed is increased. In other words, limitations are imposed on the amount of fluid conveyable in the column per unit time and large throughput is difficult to attain. Meanwhile, if the porosity in the packed layer portion with the DNA complex is more than 90%, so-called "bypass passage" where fluid can pass through the packed layer portion without coming into contact with the packing agent tends to be formed in the packed layer portion in general. Conversely, in the case of the porosity more than 90% as well, the complicated arrangement and design of the packing agent including the shape of the carrier used are required for bringing fluid containing a DNA intercalator into high-frequency contact with the DNA complex being packed; or otherwise, the velocity of conveyance is required to be lowered for increasing the total hours of contact between the DNA complex being packed and the fluid containing a DNA intercalator. This case results in limitations on the amount of fluid conveyable in the column per unit time and large throughput is difficult to attain.

It is noted that the structure designed for the adsorption of a DNA intercalator according to the present invention can be further used in complexed passage organization in which the above-described structures in the form of a column are linked in series or in parallel or are linked in a combination of series connection and parallel connection. Moreover, it is more preferable to bring the DNA complex into contact with fluid containing a DNA intercalator in a liquid phase, particularly, an aqueous medium. That is, the structure designed for the adsorption of a DNA intercalator according to the present invention can be applied as, for example, a clean-up module for removing dioxin and dioxin-like substances dissolved in leachate and ground water from polluted soils or garbage and washing effluent from garbage incinerators, which contain dioxin and dioxin-like substances at low concentrations as DNA intercalators to be adsorbed. Furthermore, the structure designed for the adsorption of a DNA intercalator can preferably be applied to a purification module for milk and the like that is likely to be polluted by dioxin and dioxin-like substances. Alternatively, when air that is likely to be polluted by dioxin and dioxin-like substances is subjected to washing with water and so on in advance and the dioxin and dioxin-like substances are recovered from the gaseous phase into the liquid phase, the structure designed for the adsorption of a DNA intercalator can also be applied to a purification module for the water used in such washing.

EXAMPLES

The present invention will be explained specifically by the following examples. The examples described below are examples of the best embodiment of the present invention, but the present invention is not limited to this particular form of the examples.

Example 1

[Synthesis of DNA Complex A1]

A DNA sample in Example 1 obtained from a salmon testis contains protamine as a main component of DNA binding protein. The molecular weight of the DNA in the DNA sample used here is 6 million, and double strand DNA molecule occupies 26% by mass of the sample. The sample also contains 3 parts by mass of DNA binding protein component, of which protamine is the main component, per 100 parts by mass of DNA. A DNA/protein aqueous solution was prepared by dissolving 5 parts by mass of the DNA sample from the salmon testis, which had the DNA/DNA binding protein composition, in 1000 parts by mass of deionized water.

One hundred fifty parts by mass of the DNA/protein solution was added to 100 parts by mass of silica sol (silica particle size: 30 nm, silica concentration: 30% by mass), and the mixture is stirred for 30 min, and then dried at 60° C. to obtain a DNA/protein/silica complex. This complex was pulverized and fractionated to obtain particles with a particle size between 1 mm and 4 mm using a sieve. This fraction was designated as a DNA complex A1. The bulk density of the dry DNA complex A1 was 0.73 g/cm$^3$. Further, the DNA complex A1 contains 2.4% by mass of DNA and 2.8 parts by mass of the DNA binding protein component relative to 100 parts by mass of DNA.

[Measurement for Intercalation Ability by Mass IcM]

One gram of the dry DNA complex A1 is immersed in 100 ml of an aqueous solution of 50 ppm ethidium bromide for 7 days for the DNA complex A1 to absorb ethidium bromide, and then the concentration of ethidium bromide remaining in the aqueous solution is measured by absorptiometric analysis. The amount of ethidium bromide adsorbed onto the DNA complex A1 is calculated based on the difference of the concentrations before and after the adsorption.

Intercalation ability by mass (IcM) defined in terms of the maximum adsorption mass (mg) of ethidium bromide (EB) per unit mass (1 g) of the DNA complex was obtained from the calculated amount of adsorbed ethidium bromide and found to be 3.6 [mg EB/g DNA complex]. The amount of DNA eluted into the aqueous solution from the DNA complex A1 during the immersion was also measured. Less than 1% of the total DNA in the DNA complex A1 was eluted into the aqueous solution.

[Adsorption of DNA Intercalator/Ethidium Bromide]

A column with 2 cm diameter was packed with the DNA complex A1 to form about 10 cm of an adsorbing layer. The porosity of the packed layer of the DNA complex A1 column was 64%. A 50 ppm ethidium bromide solution was applied to the column with the DNA complex A1 adsorbing layer at the flow rate of 10 mL/min with a tube pump. The liquid volume of the adsorbing layer of the column is 20 ml, and the time required for passing through the adsorbing layer is estimated to be 2 min.

After starting the application of the solution, the pass through liquid was collected at 10 min (after treating 100 ml) and 30 min (after treating 300 ml) to measure the concentration of remaining ethidium bromide by absorptiometric analysis. The concentrations of ethidium bromide remaining in the column pass through fractions at both 10 min and 30 min were the detection limit or lower.

Example 2

[Adsorption of DNA Intercalator/Dibenzofuran]

A column with an adsorbing layer of the DNA complex A1 was prepared in the same condition as described in Example 1. A 5 ppm dibenzofuran solution was applied to the column with the DNA complex A1 adsorbing layer at the flow rate of 10 mL/min with a tube pump.

After starting the application of the solution, the pass through liquid was collected at 10 min (after treating 100 ml) and 30 min (after treating 300 ml) to measure the concentration of remaining dibenzofuran by absorptiometric analysis. The concentrations of dibenzofuran remaining in the column pass through fractions at both 10 min and 30 min were the detection limit or lower.

Example 3

[Synthesis of DNA Complex A2]

The DNA sample in Example 3 obtained from salmon testis also contains protamine as the main component of DNA binding protein. The molecular weight of the DNA in the DNA sample used is 1.7 million and double strand DNA molecule occupies 7.2% by mass of the sample. The sample also contains 2.8 parts by mass of DNA binding protein component, of which protamine was the main component, per 100 parts by mass of DNA. A DNA/protein solution was prepared by dissolving 7 parts by mass of the DNA sample from salmon testis, which had the DNA/DNA binding protein composition, in 1000 parts by mass of deionized water.

One hundred fifty parts by mass of the DNA/protein solution was added to 100 parts by mass of silica sol (silica particle size: 30 nm, silica concentration: 30% by mass), and the mixture was stirred for 30 min, and then dried at 60° C. to obtain a DNA/protein/silica complex. This complex was pulverized and fractionated to obtain particles with a particle size between 1 mm and 4 mm using a sieve. This fraction was designated as a DNA complex A2. The bulk density of the dry DNA complex A2 was 0.75 g/cm$^3$. Further, the DNA complex A2 contains 2.5% by mass of DNA and 2.5 parts by mass of the DNA binding protein component relative to 100 parts by mass of DNA.

[Measurement for Intercalation Ability by Mass IcM]

The IcM of the DNA complex A2 measured according to the method in Example 1 was 2.7 [mg EB/g DNA complex]. The amount of DNA eluted from the DNA complex A2 to the aqueous solution during the 7 hour immersion is measured. The amount of DNA eluted was less than 1% of the total DNA in the DNA complex A2.

[Adsorption of DNA Intercalator]

A column with 2 cm diameter was packed with the DNA complex A2 to form about 10 cm of an adsorbing layer. The porosity of the packed layer of the DNA complex A2 column was 66%. A 50 ppm ethidium bromide solution was applied to the column with the DNA complex A2 adsorbing layer at the flow rate of 10 mL/min with a tube pump. The liquid volume of the adsorbing layer of the column is 21 ml, and the time required for passing through the adsorbing layer is estimated to be 2 min.

After starting the application of the solution, the pass through liquid was collected at 10 min (after treating 100 ml) and 30 min (after treating 300 ml) to measure the concentration of remaining ethidium bromide by absorptiometric analysis. The concentrations of ethidium bromide remaining in the column pass through fractions at both 10 min and 30 min were the detection limit or lower.

Example 4

[Synthesis of DNA Complex A3]

The DNA sample in Example 4 obtained from salmon testis also contains protamine as the main component of DNA binding protein. The molecular weight of the DNA in the DNA sample used is 150,000 and double strand DNA molecule occupies 22% by mass of the sample. The sample also contains 0.80 parts by mass of DNA binding protein component, of which protamine is the main component, per 100 parts by mass of DNA. A DNA/protein solution was prepared by dissolving 5 parts by mass of the DNA sample from salmon testis, which had the DNA/DNA binding protein composition, in 1000 parts by mass of deionized water.

One hundred fifty parts by mass of the DNA/protein solution was added to 100 parts by mass of silica sol (silica particle size: 30 nm, silica concentration: 30% by mass), and the mixture was stirred for 30 min, and then dried at 60° C. to obtain a DNA/protein/silica complex. This complex was pulverized and fractionated to obtain particles with a particle size between 2 mm and 4.5 mm using a sieve. This fraction was designated as a DNA complex A3. The bulk density of the dry DNA complex A3 was 0.71 g/cm$^3$. Further, the DNA complex A3 contains 1.60% by mass of DNA and 0.75 parts by mass of the DNA binding protein component relative to 100 parts by mass of DNA.

[Measurement for Intercalation Ability by Mass IcM]

The IcM of the DNA complex A3 measured according to the method in Example 1 was 2.1 [mg EB/g DNA complex]. The amount of DNA eluted from the DNA complex A3 to the aqueous solution during the 7 hour immersion was measured. The amount of DNA eluted was less than 1% of the total DNA in the DNA complex A3.

[Adsorption of DNA Intercalator]

A column with 2 cm diameter was packed with the DNA complex A3 to form about 10 cm of an adsorbing layer. The porosity of the packed layer of the DNA complex A3 column was 66%. A 50 ppm ethidium bromide solution was applied to the column with the DNA complex A3 adsorbing layer at the flow rate of 10 mL/min with a tube pump. The liquid volume of the adsorbing layer of the column is 21 ml, and the time required for passing through the adsorbing layer is estimated to be 2 min.

After starting the application of the solution, the pass through liquid was collected at 10 min (after treating 100 ml) and 30 min (after treating 300 ml) to measure the concentration of remaining ethidium bromide by absorptiometric analysis. The concentrations of ethidium bromide remaining in the column pass through fractions at both 10 min and 30 min were the detection limit or lower.

Example 5

[Synthesis of DNA Complex A4]

The DNA sample in Example 5 obtained from salmon testis also contains protamine as the main component of DNA binding protein. The molecular weight of the DNA in the DNA sample used is 7 million and double strand DNA molecule occupies 50% by mass of the sample. The sample also contains 1.5 parts by mass of DNA binding protein component, of which protamine is the main component, per 100 parts by mass of DNA. A DNA/protein solution was prepared by dissolving 5 parts by mass of the DNA sample from salmon testis, which had the DNA/DNA binding protein composition, in 1000 parts by mass of deionized water.

Three hundred parts by mass of the DNA/protein solution was added to 100 parts by mass of silica sol (silica particle size: 30 nm, silica concentration: 30% by mass), and the mixture was stirred for 30 min, and then dried at 60° C. to obtain a DNA/protein/silica complex. This complex was pulverized and fractionated to obtain particles with a particle size between 1 mm and 4 mm using a sieve. This fraction was designated as a DNA complex A4. The bulk density of the dry DNA complex A4 was 0.70 g/cm$^3$. Further, the DNA complex A4 contains 4.5% by mass of DNA and 1.5 parts by mass of the DNA binding protein component relative to 100 parts by mass of DNA.

[Measurement for Intercalation Ability by Mass IcM]

The IcM of the DNA complex A4 measured according to the method in Example 1 was 7.5 [mg EB/g DNA complex]. The amount of DNA eluted from the DNA complex A4 to the aqueous solution during the 7 hour immersion was measured. The amount of DNA eluted was less than 1% of the total DNA in the DNA complex A4.

[Adsorption of DNA Intercalator]

A column with 2 cm diameter was packed with the DNA complex A4 to form about 10 cm of an adsorbing layer. The porosity of the packed layer of the DNA complex A4 column was 65%. A 50 ppm ethidium bromide solution was applied to the column with the DNA complex A4 adsorbing layer at the flow rate of 10 mL/min with a tube pump. The liquid volume of the adsorbing layer of the column is 20 ml, and the time required for passing through the adsorbing layer is estimated to be 2 min.

After starting the application of the solution, the pass through liquid was collected at 10 min (after treating 100 ml) and 30 min (after treating 300 ml) to measure the concentration of remaining ethidium bromide by absorptiometric analysis. The concentrations of ethidium bromide remaining in the column pass through fractions at both 10 min and 30 min were the detection limit or lower.

Example 6

[Synthesis of DNA Complex A5]

The DNA sample in Example 6 obtained from salmon testis also contains protamine as the main component of DNA binding protein. The molecular weight of the DNA in the DNA sample used is 7.2 million and double strand DNA molecule occupies 35% by mass of the sample. The sample also contains 9.2 parts by mass of DNA binding protein component, of which protamine is the main component, per 100 parts by mass of DNA. A DNA/protein solution was prepared by dissolving 5 parts by mass of the DNA sample from salmon testis, which had the DNA/DNA binding protein composition, in 1000 parts by mass of deionized water.

One hundred fifty parts by mass of the DNA/protein solution was added to 100 parts by mass of silica sol (silica particle size: 30 nm, silica concentration: 30% by mass), and the mixture was stirred for 30 min, and then dried at 60° C. to obtain a DNA/protein/silica complex. This complex was pulverized and fractionated to obtain particles with a particle size between 1 mm and 4 mm using a sieve. This fraction was designated as a DNA complex A5. The bulk density of the dry DNA complex A5 was 0.69 g/cm$^3$. Further, the DNA complex A5 contains 2.3% by mass of DNA and 9.0 parts by mass of the DNA binding protein component relative to 100 parts by mass of DNA.

[Measurement for Intercalation Ability by Mass IcM]

The IcM of the DNA complex A5 measured according to the method in Example 1 was 3.4 [mg EB/g DNA complex]. The amount of DNA eluted from the DNA complex A5 to the aqueous solution during the 7 hour immersion was measured. The amount of DNA eluted was less than 1% of the total DNA in the DNA complex A5.

[Adsorption of DNA Intercalator]

A column with 2 cm diameter was packed with the DNA complex A5 to form about 10 cm of an adsorbing layer. The porosity of the packed layer of the DNA complex A5 column was 66%. A 50 ppm ethidium bromide solution was applied to the column with the DNA complex A5 adsorbing layer at the flow rate of 10 mL/min with a tube pump. The liquid volume of the adsorbing layer of the column is 21 ml, and the time required for passing through the adsorbing layer is estimated to be 2.1 min.

After starting the application of the solution, the pass through liquid was collected at 10 min (after treating 100 ml) and 30 min (after treating 300 ml) to measure the concentration of remaining ethidium bromide by absorptiometric analysis. The concentrations of ethidium bromide remaining in the column pass through fractions at both 10 min and 30 min were the detection limit or lower.

Example 7

[Synthesis of DNA Complex A6]

A DNA/protein aqueous solution with the same composition as that in Example 3 was prepared using the same conditions as described in Example 3.

Eighty parts by mass of the DNA/protein solution was added to 100 parts by mass of silica sol (silica particle size: 30 nm, silica concentration: 30% by mass), and the mixture was stirred for 30 min, and then dried at 60° C. to obtain a DNA/protein/silica complex. This complex was pulverized and fractionated to obtain particles with a particle size between 1 mm and 4 mm using a sieve. This fraction was designated as a DNA complex A6. The bulk density of the dry DNA complex A6 was 0.78 g/cm$^3$. Further, the DNA complex A6 contains 1.05% by mass of DNA and 2.4 parts by mass of the DNA binding protein component relative to 100 parts by mass of DNA.

[Measurement for Intercalation Ability by Mass IcM]

The IcM of the DNA complex A6 measured according to the method in Example 1 was 0.9 [mg EB/g DNA complex]. The amount of DNA eluted from the DNA complex A6 to the aqueous solution during the 7 hour immersion was measured. The amount of DNA eluted was less than 1% of the total DNA in the DNA complex A6.

[Adsorption of DNA Intercalator]

A column with 2 cm diameter was packed with the DNA complex A6 to form about 10 cm of an adsorbing layer. The porosity of the packed layer of the DNA complex A6 column is 60%. A 50 ppm ethidium bromide solution was applied to the column with the DNA complex A6 adsorbing layer at the flow rate of 10 mL/min with a tube pump. The liquid volume of the adsorbing layer of the column is 19 mL, and the time required for passing through the adsorbing layer is estimated to be 2 min.

After starting the application of the solution, the pass through liquid was collected at 10 min (after treating 100 ml) and 30 min (after treating 300 ml) to measure the concentration of remaining ethidium bromide by absorptiometric analysis. The concentrations of ethidium bromide remaining in the column pass through fractions at both 10 min and 30 min were the detection limit or lower.

Comparative Example 1

[Synthesis of DNA Complex B1]

The DNA sample in Comparative Example 1 obtained from salmon testis used in Comparative Example 1 also contains protamine as the main component of DNA binding protein. The molecular weight of the DNA in the DNA sample used is 6 million and double strand DNA molecule occupies 26% by mass of the sample. The sample also contains 12 parts by mass of DNA binding protein component, of which protamine is the main component, per 100 parts by mass of DNA. A DNA/protein solution was prepared by dissolving 5 parts by mass of the DNA sample from salmon testis, which had the DNA/DNA binding protein composition, in 1000 parts by mass of deionized water.

One hundred fifty parts by mass of the DNA/protein solution was added to 100 parts by mass of silica sol (silica particle size: 30 nm, silica concentration: 30% by mass), and the mixture was stirred for 30 min, and then dried at 60° C. to obtain a DNA/protein/silica complex. This complex was pulverized and fractionated to obtain particles with a particle size between 1 mm and 4 mm using a sieve. This fraction was designated as a DNA complex B1. The bulk density of the dry DNA complex B1 was 0.70 g/cm$^3$. Further, the DNA complex B1 contains 2.1% by mass of DNA and 11 parts by mass of the DNA binding protein component relative to 100 parts by mass of DNA.

[Measurement for Intercalation Ability by Mass IcM]

The IcM of the DNA complex B1 measured according to the method in Example 1 was 0.3 [mg EB/g DNA complex]. The amount of DNA eluted from the DNA complex B1 to the aqueous solution during the 7 hour immersion was measured. The amount of DNA eluted was 1% by mass of the total DNA in the DNA complex B1.

Comparative Example 2

[Synthesis of DNA Complex B2]

The DNA sample in Comparative Example 2 obtained from salmon testis used also contains protamine as the main component of DNA binding protein. The molecular weight of the DNA in the DNA sample used is 100,000 and double strand DNA molecule occupies 12% by mass of the sample. The sample also contains 0.4 parts by mass of DNA binding protein component, of which protamine is the main component, per 100 parts by mass of DNA. A DNA/protein solution was prepared by dissolving 5 parts by mass of the DNA sample from salmon testis, which had the DNA/DNA binding protein composition, in 1000 parts by mass of deionized water.

One hundred fifty parts by mass of the DNA/protein solution was added to 100 parts by mass of silica sol (silica particle size: 30 nm, silica concentration: 30% by mass), and the mixture was stirred for 30 min, and then dried at 60° C. to obtain a DNA/protein/silica complex. This complex was pulverized and fractionated to obtain particles with a particle size between 1 mm and 4 mm using a sieve. This fraction was designated as a DNA complex B2. The bulk density of the dry DNA complex B2 was 0.72 g/cm$^3$. Further, the DNA complex B2 contains 2.2% by mass of DNA and 0.39 parts by mass of the DNA binding protein component relative to 100 parts by mass of DNA.

[Measurement for Intercalation Ability by Mass IcM]

The IcM of the DNA complex B2 measured according to the method in Example 1 was 1.0 [mg EB/g DNA complex]. The amount of DNA eluted from the DNA complex B2 to the aqueous solution during the 7 hour immersion was measured. The amount of DNA eluted was less than 20% by mass of the total DNA in the DNA complex B2.

[Adsorption of DNA Intercalator]

A column with 2 cm diameter was packed with the DNA complex B2 to form about 10 cm of an adsorbing layer. The porosity of the packed layer of the DNA complex B2 column is 63%. A 50 ppm ethidium bromide solution was applied to the column with the DNA complex B2 adsorbing layer at the flow rate of 10 mL/min with a tube pump. The liquid volume of the adsorbing layer of the column is 20 mL, and the time required for passing through the adsorbing layer is estimated to be 2 min.

After starting the application of the solution, the pass through liquid was collected between 10 min (after treating 100 ml) and 30 min (after treating 300 ml) to measure the concentration of remaining ethidium bromide by absorptiometric analysis. The concentration of ethidium bromide remaining in the column pass through fraction at 20 min was about 25 ppm.

Comparative Example 3

[Synthesis of DNA Complex B3]

A DNA/protein aqueous solution with the same composition as that in Example 3 was prepared using the same conditions as described in Example 3.

Thirty parts by mass of the DNA/protein solution was added to 100 parts by mass of silica sol (silica particle size: 30 nm, silica concentration: 30% by mass), and the mixture was stirred for 30 min, and then dried at 60° C. to obtain a DNA/protein/silica complex. This complex was pulverized and fractionated to obtain particles with a particle size between 1 mm and 4 mm using a sieve. This fraction was designated as a DNA complex B3. The bulk density of the dry DNA complex B3 was 0.78 g/cm$^3$. Further, the DNA complex B3 contains 0.46% by mass of DNA and 2.4 parts by mass of the DNA binding protein component relative to 100 parts by mass of DNA.

[Measurement for Intercalation Ability by Mass IcM]

The IcM of the DNA complex B3 measured according to the method in Example 1 was 0.4 [mg EB/g DNA complex]. The amount of DNA eluted from the DNA complex B3 to the aqueous solution during the 7 hour immersion was measured. The amount of DNA eluted was 1% by mass of the total DNA in the DNA complex B3.

[Adsorption of DNA Intercalator]

A column with 2 cm diameter was packed with the DNA complex B3 to form about 10 cm of an adsorbing layer. The porosity of the packed layer of the DNA complex B3 column was 61%. A 50 ppm ethidium bromide solution was applied to the column with the DNA complex B3 adsorbing layer at the flow rate of 10 mL/min with a tube pump. The liquid volume of the adsorbing layer of the column is 19 mL, and the time required for passing through the adsorbing layer is estimated to be 2 min.

After starting the application of the solution, the pass through liquid was collected at 10 min (after treating 100 ml) and 30 min (after treating 300 ml) to measure the concentration of remaining ethidium bromide by absorptiometric analysis. The concentrations of ethidium bromide remaining in the column pass through fractions at 10 min and 30 min were 17 ppm and 30 ppm, respectively.

INDUSTRIAL APPLICABILITY

According to the present invention, DNA intercalators including dioxin and dioxin-like substances and other substances can selectively be removed with high efficiency from water, gas and the like containing them. Moreover, the present invention is used to allow treatment for harmful substances difficult to remove such as dioxin and dioxin-like substances in the environment and in exhaust from incinerators.

The present invention is not limited to the above embodiments and various changes and modifications can be made within the spirit and scope of the present invention. Therefore to apprise the public of the scope of the present invention, the following claims are made.

This application claims priority from Japanese Patent Application No. 2004-176890 filed on Jun. 15, 2004, which is hereby incorporated by reference herein.

The invention claimed is:

1. A structure designed for adsorption of a DNA intercalator employed by a procedure in which a DNA intercalator contained in liquid or gas is selectively adsorbed onto DNA by contacting the DNA with the DNA intercalator, comprising:

an adsorbing layer having, as a unit component, a DNA complex comprising a DNA-binding protein in the form of a nuclear protein, DNA including double strand DNA and a carrier, as an adsorbing layer on which the DNA intercalator is selectively adsorbed, wherein the DNA complex contains 0.5 to 10 parts by mass of the DNA-binding protein component per 100 parts by mass of the DNA including double strand DNA, and wherein intercalation ability by mass (IcM) defined in terms of the maximum adsorption mass (mg) of ethidium bromide (EB) per unit mass (1 g) of the DNA complex is 0.5 or more [mg EB/g DNA complex)].

2. The structure designed for the adsorption of a DNA intercalator according to claim 1, wherein the DNA-binding protein contained in the DNA complex is mainly composed of both or either of protamine and(or) histone.

3. The structure designed for the adsorption of a DNA intercalator according to claim 1, wherein the adsorbing layer in the structure for the adsorption of a DNA intercalator is in the form of a column packed with the DNA complex.

4. The structure designed for the adsorption of a DNA intercalator according to claim 3, wherein the DNA complex is in a particle or cloth form.

5. The structure designed for the adsorption of a DNA intercalator according to claim 3, wherein the carrier contained in the DNA complex is porous.

6. The structure designed for the adsorption of a DNA intercalator according to claim 5, wherein the porous carrier is formed with an oxide.

7. The structure designed for the adsorption of a DNA intercalator according to claim 6, wherein the oxide is a mixture of silica and a metal oxide.

8. The structure designed for the adsorption of a DNA intercalator according to claim 3, wherein a packed layer portion with the DNA complex in a column packed with the DNA complex has a porosity of 10 to 90%.

9. The structure designed for the adsorption of a DNA intercalator according to claim 1, wherein the DNA including double strand DNA contained in the DNA complex is DNA including double strand DNA that is collected from the testis from a salmon and/or the digestive caecum from a scallop.

10. The structure designed for the adsorption of a DNA intercalator according to claim 1, wherein the DNA intercalator to be adsorbed is any of dioxin and dioxin-like substances selected from polychlorinated dibenzo-para-dioxanes, polychlorinated dibenzofurans and coplanar polychlorinated biphenyls.

* * * * *